US011267755B2

(12) United States Patent
Zhang et al.

(10) Patent No.: US 11,267,755 B2
(45) Date of Patent: Mar. 8, 2022

(54) CONSTRUCTION MATERIAL WITH IMPROVED STRENGTH AND WATER RESISTANCE AND METHODS OF FORMING THE SAME

(71) Applicant: ARIZONA BOARD OF REGENTS ON BEHALF OF THE UNIVERSITY OF ARIZONA, Tucson, AZ (US)

(72) Inventors: Jinhong Zhang, Tucson, AZ (US); Qingming Feng, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 597 days.

(21) Appl. No.: 15/999,827

(22) PCT Filed: Feb. 16, 2017

(86) PCT No.: PCT/US2017/018047
§ 371 (c)(1),
(2) Date: Aug. 20, 2018

(87) PCT Pub. No.: WO2017/142986
PCT Pub. Date: Aug. 24, 2017

(65) Prior Publication Data
US 2021/0214276 A1 Jul. 15, 2021

Related U.S. Application Data

(60) Provisional application No. 62/297,560, filed on Feb. 19, 2016.

(51) Int. Cl.
| C04B 12/00 | (2006.01) |
| C04B 18/08 | (2006.01) |
| C04B 18/12 | (2006.01) |
| C04B 111/27 | (2006.01) |

(52) U.S. Cl.
CPC ............ *C04B 12/005* (2013.01); *C04B 18/08* (2013.01); *C04B 18/12* (2013.01); *C04B 2111/27* (2013.01)

(58) Field of Classification Search
CPC ....... C04B 12/005; C04B 18/08; C04B 18/12; C04B 22/062; C04B 28/006; C04B 28/021; C04B 2111/27; Y02W 30/93; Y02P 40/165
See application file for complete search history.

(56) References Cited

U.S. PATENT DOCUMENTS

| 2009/0071374 A1 | 3/2009 | Van et al. |
| 2013/0061776 A1 | 3/2013 | Allouche et al. |
| 2013/0125792 A1 | 5/2013 | Fried |
| 2014/0264140 A1 | 9/2014 | Gong |
| 2015/0007751 A1 | 1/2015 | Gupta et al. |
| 2015/0251951 A1 | 9/2015 | Zhang et al. |

FOREIGN PATENT DOCUMENTS

| CN | 86107869 | 8/1987 |
| CN | 102159516 A | 8/2011 |
| CN | 102344296 A | 2/2012 |
| CN | 106810188 A | 6/2017 |
| CN | 108349807 A | 7/2018 |
| EP | 1 801 084 A1 | 6/2007 |
| WO | WO2012170667 A1 | 12/2012 |
| WO | WO 2016/049010 A | 4/2015 |

OTHER PUBLICATIONS

Feng, "Applying Mine Tailing and Fly Ash as Construction Materials for a Sustainable Development". The University of Arizona, Electronic Dissertation, pp. 1-139. (Year: 2015).*
Zhang et al., Synthesis and characterization of fly ash modified mine tailings-based geopolymers, Construction and Building Materials, vol. 25, May 4, 2011, pp. 3773-3781.
Yang, Geopolymerization of Copper Mine Tailings, Thesis, Department of Mining, Geological and Geophysical Engineering, The University of Arizona, 2012, pp. 1-54.
Zhang J. et al. "Geopolymers for immobilization of Cr6+, Cd2+, and Pb2+", Journal of Hazardous Materials, Elsevier, Amsterdam, NL, vol. 157, No. 2-3, Sep. 15, 2008, pp. 587-598.
Supplementary European Search Report of European Application No. 16 85 8029.
Feng, "Applying Mine Tailing and Fly Ash as Construction Materials for a Sustainable Development", The University of Arizona, Repository, 2015, Abstract.

* cited by examiner

*Primary Examiner* — Anthony J Green
(74) *Attorney, Agent, or Firm* — Blank Rome LLP

(57) ABSTRACT

The invention is directed to a mine tailing and fly ash containing construction material having improved compressive strength and water resistance. The mine tailing and fly ash containing material includes mine tailing, fly ash, an alkali solution comprising sodium hydroxide and, optionally, calcium hydroxide, and water. The invention further provides a geopolymerization method of forming a mine tailing and fly ash containing construction material.

17 Claims, 5 Drawing Sheets

CONSTRUCTION MATERIAL WITH IMPROVED STRENGTH AND WATER RESISTANCE AND METHODS OF FORMING THE SAME

CROSS-REFERENCE TO RELATED APPLICATIONS

This application is a national phase application of PCT/US2017/018047, filed Feb. 16, 2017, which claims priority to U.S. Provisional Application No. 62/297,560, filed Feb. 19, 2016. The entire contents of those applications are incorporated herein by reference.

FIELD OF THE INVENTION

The invention is directed to mine tailing (MT) and fly ash (FA) containing construction materials and geopolymerization methods of forming the same.

BACKGROUND

Geopolymerization is a process of obtaining a polymeric structure from an aluminosilicate material by dissolving at least one aluminosilicate source in a strong alkali solution, such as sodium hydroxide (NaOH), at an elevated temperature. After being cured at an elevated temperature for a specific time, the product formed from the geopolymerization process exhibits increased compressive strength. As such, the resulting product can be used as a construction material, such as for bricks or road pavement. Conventional construction materials, such as concrete, require the addition of aggregate materials to improve compressive strength, but geopolymerized products do not. Further, the manufacture of conventional construction materials results in a high amount of greenhouse gas emissions, which does not occur during the manufacture of geopolymerized products. As such, the geopolymerization process provides a very promising approach to utilizing aluminosilicate-based materials, such as mine tailing and fly ash, in place of traditional construction materials.

Mine tailing is a material produced as a byproduct when valuable materials such as metals are extracted from ores in conventional mining processes. Fly ash is a material that is produced as a byproduct during coal combustion. Each of these materials is considered to be industrial waste and, as such, needs to be carefully impounded because of the potential detrimental impact on the environment. For example, mine tailing must be stored in a tailings dam, which occupies a huge area of land and leads to high monetary, environmental, and ecological cost.

In the last twenty years, efforts have been made to try to utilize mine tailing and fly ash as construction materials in place of traditional construction materials, such as Portland cement, for a variety of reasons. First, these materials are silica/alumina rich aluminosilicate sources, which makes them ideal sources for use in the geopolymerization process. Second, because of the detrimental environment impact of both of these materials, finding an alternative use for them is advantageous from an environmental standpoint, but also helps to reduce costs associated with their storage and disposal.

Fly ash is further advantageous for use as a construction material because its particle size is usually very small (<50 microns), which is ideal for use in forming construction materials. Cement, on the other hand, typically must be ground to achieve small particle size, which increases manufacturing time and costs. Fly ash is also an ideal source for geopolymerization processes because it is reactive to alkali at relatively low temperatures as compared to other geopolymerization materials, i.e., at about 60-150° C. However, there are some disadvantages associated with the present methods of treating fly ash. First, in most of the proposed geopolymerization methods, a salient amount of sodium silicate has to be added. This makes it difficult to determine whether the achieved mechanical strength of the resulting product is due to geopolymerization between fly ash and alkali, or to the solidification of metal silicate in air at an elevated temperature, making its predictability during manufacturing difficult. Secondly, where sodium silicate is added and the resulting geopolymerization product is soaked in water, the solution pH increases sharply and the product gradually loses its compressive strength. This is detrimental in construction applications where the materials are exposed to the outside environment, such as rain or snow.

With respect to mine tailing, few advances have been made in utilizing it as a construction material because of a number of drawbacks. First, it has a relatively large particle size as compared to other aluminosilicate sources, which is undesirable for geopolymerization processes as it requires long curing times which increases manufacturing cost. It also has a low alkali reactivity, which requires a large consumption of alkali to achieve the desired reaction. Mine tailing also has a high silicon/aluminum ratio, which tends to result in a lower compressive strength and weaker resistance to water as compared to other aluminosilicate sources.

As such, improved geopolymerization processes for forming construction materials with fly ash and/or mine tailing are needed. Particularly, processes which do not require any additional components and which result in products with improved strength and water resistance are desired. Use of these materials in forming construction materials is also desired for the environmental reasons set forth above.

SUMMARY OF THE INVENTION

Accordingly, the invention provides geopolymerized construction materials formed from fly ash and/or mine tailing with improved strength and water resistance. In one embodiment, the invention relates to a construction material which consists essentially of mine tailing, fly ash, an alkali solution comprising sodium hydroxide, and water, wherein the ratio of fly ash to mine tailing ranges from about 5:100 to about 20:100, based upon weight.

In another embodiment, a geopolymerization method of forming a construction material is provided. The steps of this method include combining mine tailing, fly ash, an alkali solution comprising sodium hydroxide, and water to form a mixture, stirring the mixture, pouring the mixture into a mold, compressing the mixture, and curing the mixture, wherein the ratio of fly ash to mine tailing ranges from about 5:100 to about 20:100, based upon weight.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1A:
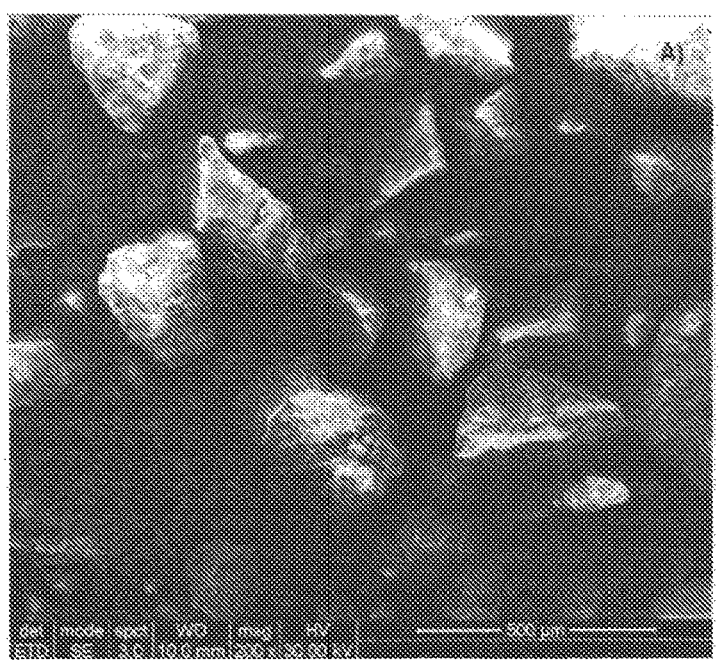
FIG. 1A is a microscopic image of reacted mine tailing samples according to an embodiment of the invention.

The present invention is directed to construction materials containing a mixture of mine tailing and fly ash with improved compressive strength and water resistance. The construction materials disclosed herein do not require the use of any additional components, such as aggregates or sodium silicate, in their formation. Methods of forming construction materials containing mine tailing and fly ash are also presented which decrease manufacturing time and costs.

Utilizing the methods set forth herein, geopolymerization products having a compressive strength of about 40-65 MPa, which is much higher than conventional concrete construction materials (about two times higher), have been prepared. Further, the curing time to form the construction material is only about 2-3 days, which is much shorter than conventional concrete. The construction materials may be formed at relatively low temperatures, i.e., about 90-170° C., as compared to other conventional construction materials. Lastly, the mine tailing and fly ash containing construction materials disclosed herein exhibit improved water resistance as compared to conventional construction materials, maintaining more than 80% of their compressive strength after being soaked for thirty days in water. Many conventional construction materials, or those that have been prepared using fly ash and/or mine tailing, lose most if not all of their compressive strength after such prolonged soaking in water.

The mine tailing and fly ash containing construction material set forth herein generally includes four components: (1) mine tailing; (2) fly ash; (3) an alkali solution, e.g., NaOH and/or $Ca(OH)_2$; and (4) water. No additional components, such as aggregate (typical in conventional concretes) or sodium silicate (typical in current fly ash containing materials) are added.

Any type of mine tailing may be used to form the construction materials set forth herein. In one embodiment, mine tailing collected from a copper mine is used.

Two types of fly ash—Class F and Class C—may be utilized in the composition. In one embodiment, a mixture of Class F and Class C fly ash may be used. In a preferred embodiment, Class C fly ash is used. The primary difference between these classes is the amount of calcium, silica, alumina, and iron content, as well as amorphous content, in the ash.

In a preferred embodiment, the weight ratio of fly ash to mine tailing ranges from about 5:100 to 20:100. With respect to the alkali solution, in one embodiment the weight ratio of NaOH to mine tailing ranges from about 70:100 to about 80:100. In another embodiment, the ratio of $Ca(OH)_2$ to mine tailing ranges from about 5:100 to 15:100. The weight ratio of water to mine tailing ranges from about 150:100 to 200:100.

In one embodiment, the alkali solution, e.g., NaOH, may be reused as it is only included to activate the mine tailing and fly ash in the geopolymerization process.

To prepare the composition and initiate geopolymerization, a predetermined amount of mine tailing and fly ash are first combined. In one embodiment, 80-95% mine tailing and 5-20% fly ash, based upon total weight of the mine tailing/fly ash mixture, are used. To that mixture, a strong alkali solution, such as sodium hydroxide (NaOH), is added. In one embodiment, the NaOH solution is added in an amount of about 5-10 M, preferably about 10 M, to activate the geopolymerization process. An additional alkali component, such as $Ca(OH)_2$, may also be added in an amount of about 0-15%, preferably about 5%, based upon weight of the mine tailing. Each of the NaOH and $Ca(OH)_2$ components may be added to the mine tailing/fly ash mixture at varying activation temperatures and activation times to achieve the desired reaction. For example, the activation temperature may range from about 90-170° C. and the activation times may range from about 40-80 minutes.

Once the mixture is activated, it is stirred until all of the components are uniformly incorporated. In one embodiment, the mixture is then placed into a mold, compressed to form a compact structure, and cured in a final step. In an alternative embodiment, no mold is necessary and the mixture may be compressed on its own and then cured. In one embodiment, the mixture is compressed at a forming pressure of about 3-10 MPa. The curing step may be performed at a temperature of about 80-120° C., preferably about 90° C., for a period of about 2-3 days, preferably about 3 days. In an alternative embodiment, the curing step may be performed at room temperature. The resulting material is suitable for use as a construction material.

The invention will now be described in conjunction with the following, non-limiting examples.

Example 1

An exemplary mine tailing/fly ash containing construction material was prepared. Research grade sodium hydroxide (NaOH, >99%) and calcium hydroxide ($Ca(OH)_2$, >95%) were obtained commercially from Alfa Aesar. Mine tailing samples were collected from the tailing dam of a copper mine from Tucson, Ariz. Fly ash samples (Class C) were obtained commercially from Boral USA. Each of these materials was utilized without further processing.

A sodium hydroxide solution was prepared by dissolving about 100 grams of chemical pellets in about 250 grams of tap water to prepare the alkali solution. At the same time, about 140 grams of mine tailings and about 7-28 grams of fly ash (varied for different experiments) were added into a 500 mL reaction bottle. To this mixture, about 10 M of the NaOH solution was then slowly added to activate the geopolymerization process. An additional alkali component, Ca(OH)$_2$, was also added at the same time as the NaOH solution in an amount of about 7 grams. The mixture was then stirred by a mixer for about three (3) minutes to make a uniform slurry. The activation temperatures and times were varied by placing the reaction bottle in an oven. Specifically, the activation was allowed to take place at temperatures ranging from 90-170° C. for about 40-80 minutes.

In this example, the mass ratio of mine tailing to water was maintained at 0.6, and the ratio of mine tailing to fly ash was maintained at 6.7.

After the alkali activation, the reaction bottle was removed from the oven and cooled in a hood for about 40 minutes, during which time mine tailings and fly ash settled to the bottom of the reaction bottle. The supernatant was poured out of the bottle and collected for reuse. The activated mine tailing and fly ash paste was removed from the bottle, stirred for two (2) minutes and filled into a cylindrical mold which was about 6.4 cm in height and had an inner diameter of about 3.2 cm. The tailing paste in the mold was then gradually compressed manually by a hydraulic pump press with a pressure of about 3-10 MPa. After compression, the specimen was demolded and cured in an oven at about 90° C. for about three (3) days. Lastly, the cured specimen was taken out of the oven, cooled in ambient conditions for about 12 hours, and prepared for compressive strength testing.

Figure 1B:
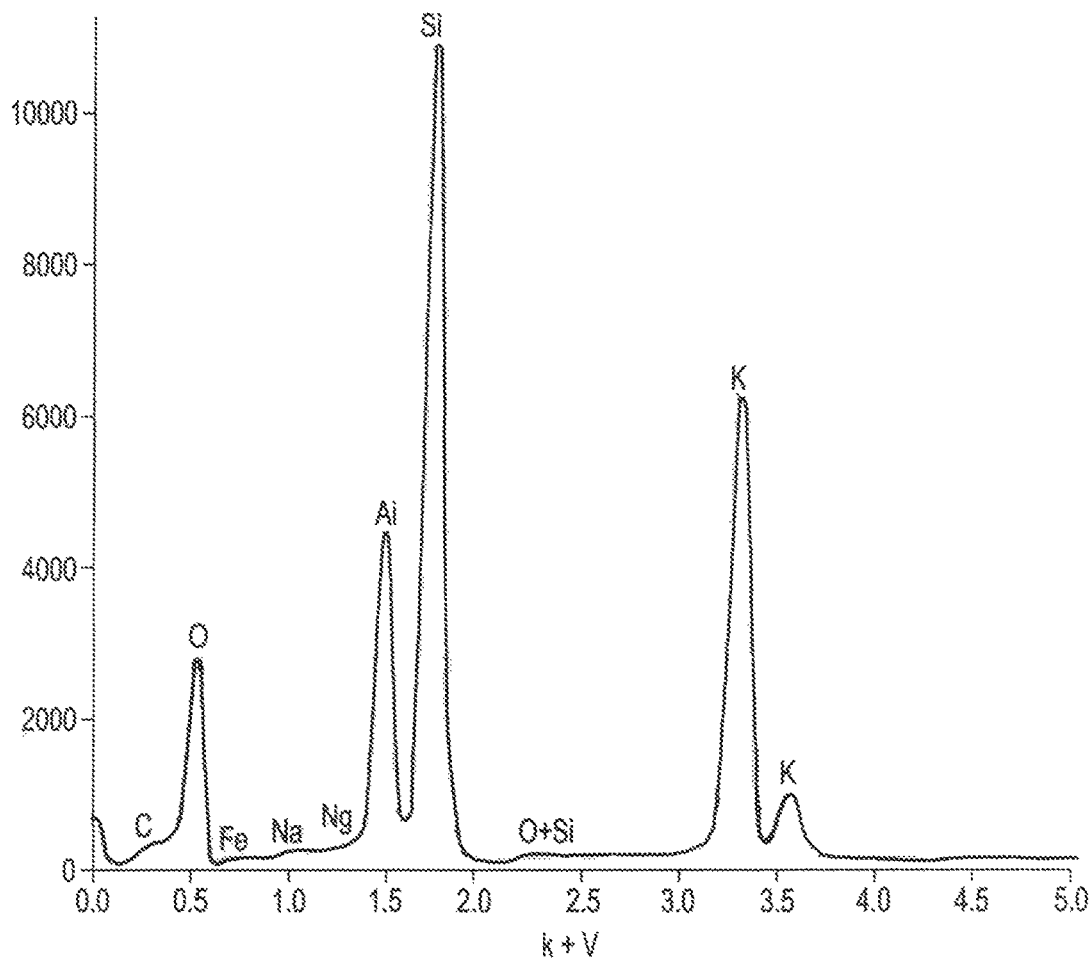
FIG. 1B is a graph of the SEM/EDS analysis of the reacted mine tailing samples of FIG. 1A.

The reacted mine tailing samples were also analyzed using a FEI INSPEC-S50/Thermo-Fisher Noran 6 microscope, as illustrated in FIG. 1A. The corresponding SEM/EDS analysis is shown in FIG. 1B. It can be seen that the main elements of the mine tailings were Si, Al, K and O, and the weight percentage of the main elements of mine tailing are listed in Table 1 below. The composition of minerals in the mine tailings is set forth in Table 2 below, and it can be seen that the mine tailing is composed mainly of quartz, K-feldspar and plagioclase. The Si/Al ratio for the mine tailings was higher than that obtained with fly ash.

TABLE 1

Major element composition of Mine Tailings

| Element | Weight % |
|---|---|
| Si | 31.60 |
| Al | 7.31 |
| Ca | 1.53 |
| Fe | 1.80 |
| S | 0.96 |
| K | 3.82 |
| Mg | 0.42 |

TABLE 2

Mineral Composition of Mine Tailings

| Mineral | Weight % |
|---|---|
| Quartz | 28.66 |
| K-feldspar | 26.44 |
| Plagioclase | 31.65 |
| Muscovite | 4.03 |
| Biotite | 1.51 |
| Swelling Clay | 2.39 |
| Kaolinite | 1.09 |
| Calcite | 1.78 |
| Pyrite | 0.61 |

The compressed and cured samples were then subjected to a uniaxial compression test. Before each measurement, both ends of the test specimen were polished with a piece of sand paper to make sure that they were flat enough for the compression test. The compressive strength of the sample was measured by the Versa Tester 30M testing machine at constant displacement rate of 0.0003 in/sec. The applied load on the specimen was measured and used to calculate the compressive strength. At a given experimental condition, a total of three measurements was taken and averaged. The experimental error associated with the compressive strength characterization was generally ±3 MPa.

Figure 2:
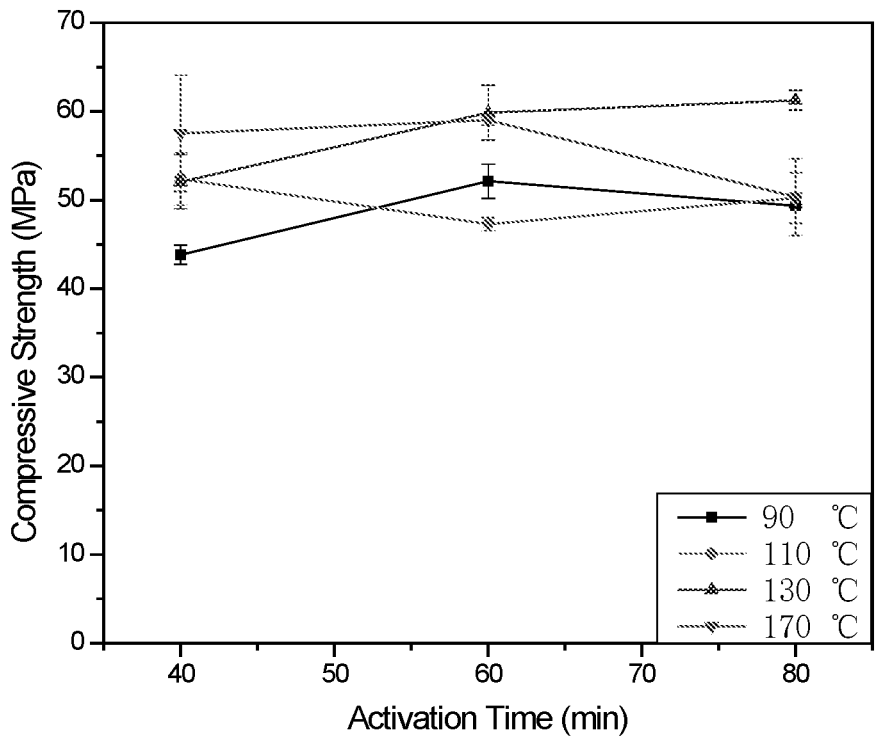
FIG. 2 is a graph representing the relationship between measured compressive strength, activation temperature, and activation time for exemplary mine tailing/fly ash construction materials according to an embodiment of the invention.

As set forth above, samples were prepared at varying activation times and temperatures. FIG. 2 illustrates the relationship between the measured compressive strength, activation temperature, and activation time. As can be seen, when the activation temperature was relatively low, for example, 90° C. or 110° C., the maximum compressive strength obtained was about 52 MPa. Further increasing the activation time does not appear to increase the compressive strength. On the other hand, when the activation temperature was relatively higher, i.e., 130° C., increasing the activation time did appear to increase compressive strength. For example, the compressive strength was about 42 MPa with an activation time of 40 minutes, but increased to almost 60 MPa when the activation time was increased to 60 minutes. For activation performed at 170° C., the maximum compressive strength was obtained at activation time of 40 minutes and the same value was obtained at 60 minutes. Accordingly, the activation time preferably varies between 90-170° C., with an activation time ranging from about 40-80 minutes. At these variables, the compressive strength of the mine tailing/fly ash construction material ranged from 40-65 MPa, well above conventional construction materials.

Example 2

Another set of exemplary mine tailing/fly ash construction material samples were prepared with varying amounts of NaOH to determine its effect on the compressive strength of the material. The compositions were prepared according to the same parameters set forth in Example 1, except that the initial mixture included mine tailing and fly ash in a weight ratio of 100:15, which was then activated with 5% Ca(OH)$_2$ (by weight, based upon the weight of mine tailing) and various concentrations of NaOH solution at 130° C. for one hour. The samples were then molded at 10 MPa forming pressure and cured at 90° C. for about three (3) days.

Figure 3:
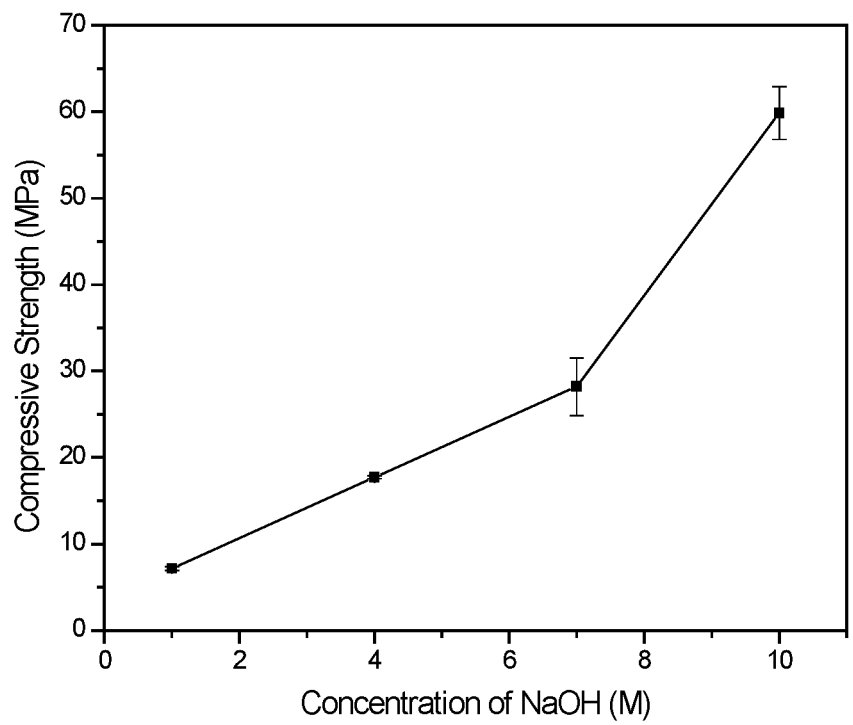
FIG. 3 is a graph representing the compressive strength as a function of the concentration of NaOH for exemplary mine tailing/fly ash construction materials according to an embodiment of the invention.

The samples were then subjected to a compression test, and the results are provided in FIG. 3. It can be seen that the compressive strength clearly increases with increasing concentration of NaOH. When the NaOH solution was added to the mine tailing/fly ash mixture at a concentration of about 1 M, the compressive strength was about 7 MPa, but when the NaOH concentration was increased to 10 M, the compressive strength increased to almost 60 MPa. As such, the preferred concentration of NaOH is about 10 M.

Example 3

Another set of exemplary mine tailing/fly ash construction material samples were prepared with varying amounts of Ca(OH)$_2$ to determine its effect on the compressive strength of the material. The compositions were prepared according to the same parameters set forth in Example 1, except that the initial mixture included mine tailing and fly ash in a weight ratio of 100:15, which was then activated with 10 M NaOH and various amounts of Ca(OH)$_2$ at 170° C. for one hour. The mixture was then molded at 10 MPa forming pressure and cured at 90° C. for about three (3) days.

Figure 4:
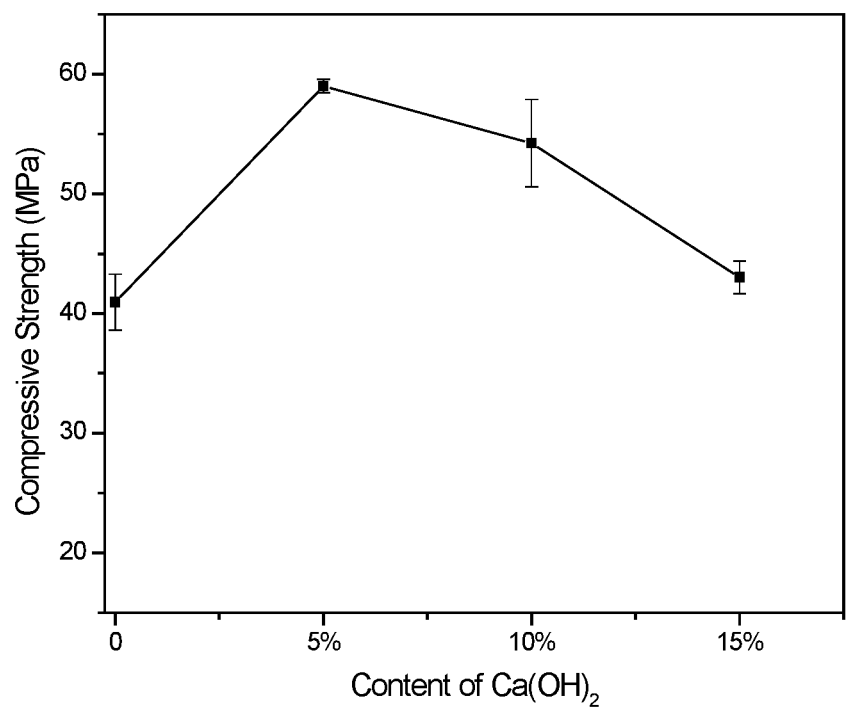
FIG. 4 is a graph representing the compressive strength as a function of the concentration of $Ca(OH)_2$ for exemplary mine tailing/fly ash construction materials according to an embodiment of the invention.

These samples were then subjected to a compression test, and the results are provided in FIG. 4. As illustrated, the compressive strength increases from about 41 MPa to about 60 MPa when the Ca(OH)$_2$ increases from 0-5%, by weight (based upon the weight of the mine tailing). In a preferred embodiment, the construction material includes about 5% by weight of Ca(OH)$_2$.

Figure 5:
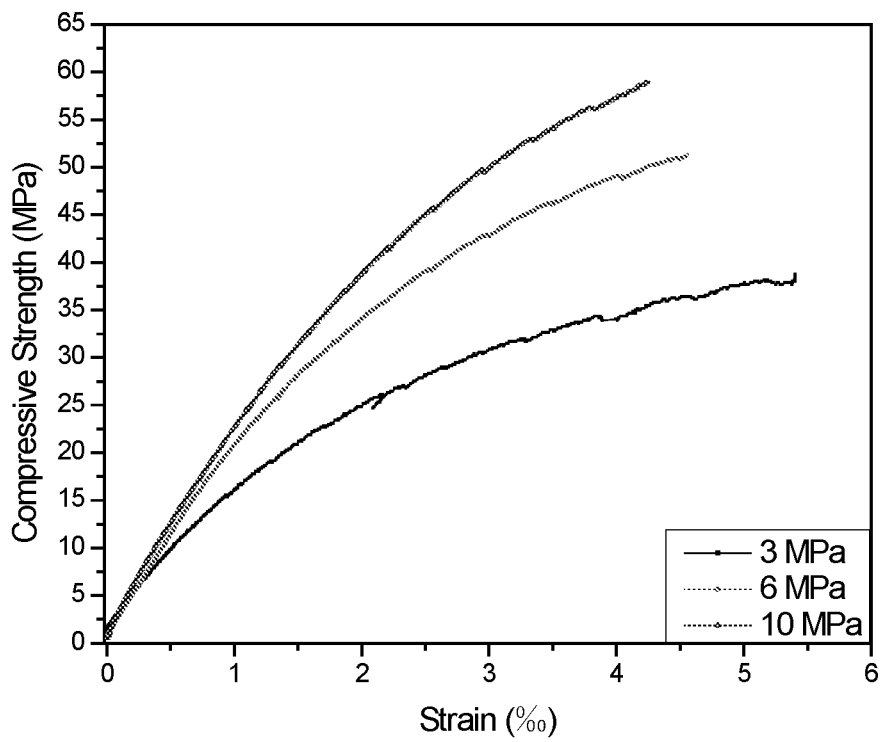
FIG. 5 is a graph representing the compressive strength as a function of strain for exemplary mine tailing/fly ash construction materials according to an embodiment of the invention.

The effect of the forming pressure on the stress-strain behavior was also studied with respect to these exemplary materials. Once the materials were prepared, they were molded at various forming pressures (i.e., 3, 6, and 10 MPa) and cured at 90° C. for three (3) days. The results are set forth in FIG. 5. As can be seen, the compressive strength of the mine tailing and fly ash containing construction material increases with increasing forming pressure. At 3 MPa, the compressive strength is about 37 MPa, but at 10 MPa, the compressive strength increases to about 60 MPa. As such, in a preferred embodiment, the forming pressure is about 10 MPa.

Example 4

Another set of exemplary mine tailing and fly ash containing construction material samples were prepared with varying amounts of fly ash to determine its effect on the compressive strength of the material. The compositions were prepared according to the same parameters set forth in Example 1, except that the initial mixture included mine tailing and fly ash in varying weight ratios, and these mixtures were activated with 10 M NaOH and 5% by weight (based upon weight of mine tailing) of Ca(OH)$_2$ at either 130° C. or 170° C. for one (1) hour. The materials were then molded at 10 MPa forming pressure and cured at 90° C. for three (3) days.

Figure 6:
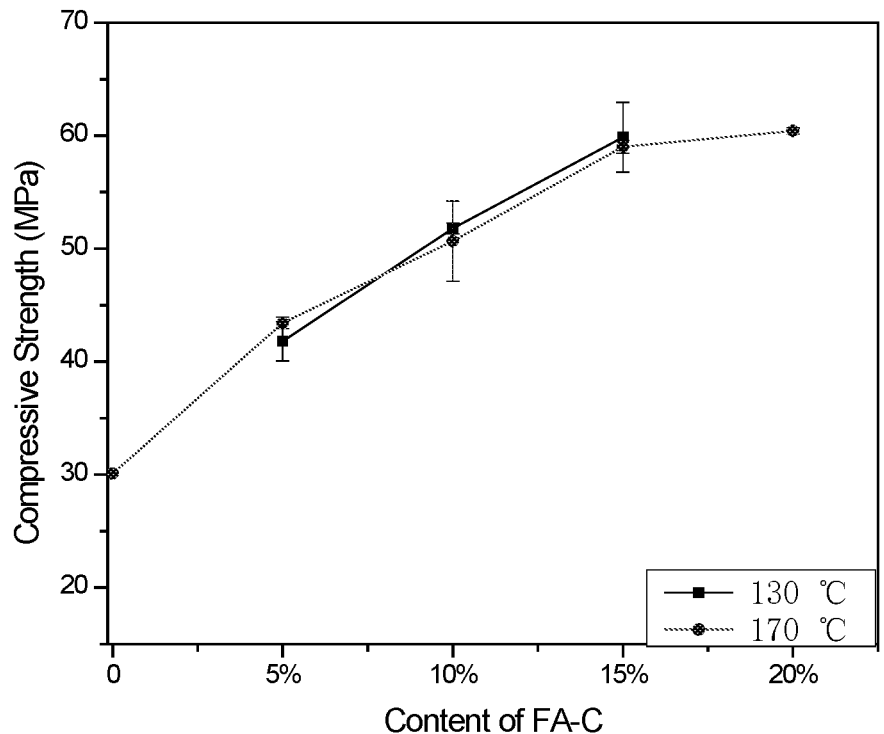
FIG. 6 is a graph representing the compressive strength as a function of the content of fly ash for exemplary mine tailing/fly ash construction materials according to an embodiment of the invention.

These samples were then subjected to a compression test, and the results are set forth in FIG. 6, which shows that the compressive strength increases with increasing weight percentage of fly ash. For example, at an activation temperature of 130° C., the compressive strength was about 42 MPa with 5% fly ash by weight. The strength increased to almost 60 MPa when the fly ash content was increased to 15% by weight. On the other hand, the amount of fly ash is preferably about 20% by weight or less, as more than 20% by weight decreases the workability of the resulting paste. In a preferred embodiment, the fly ash content is about 5-20% by weight, based upon the weight of the mine tailing.

Example 5

Another set of exemplary mine tailing and fly ash containing construction material samples were prepared and cured at varying times and temperatures to determine the effect of the curing parameters on the resulting compressive strength of the materials. The compositions were prepared according to the same procedures set forth in Example 1, except that the initial mixture included 15% by weight fly ash and was activated with 10 M NaOH and 5% by weight (based upon weight of mine tailing) of Ca(OH)$_2$ at 130° C. for one (1) hour. The materials were then molded at 10 MPa forming pressure and cured at varying times and temperatures.

Figure 7:
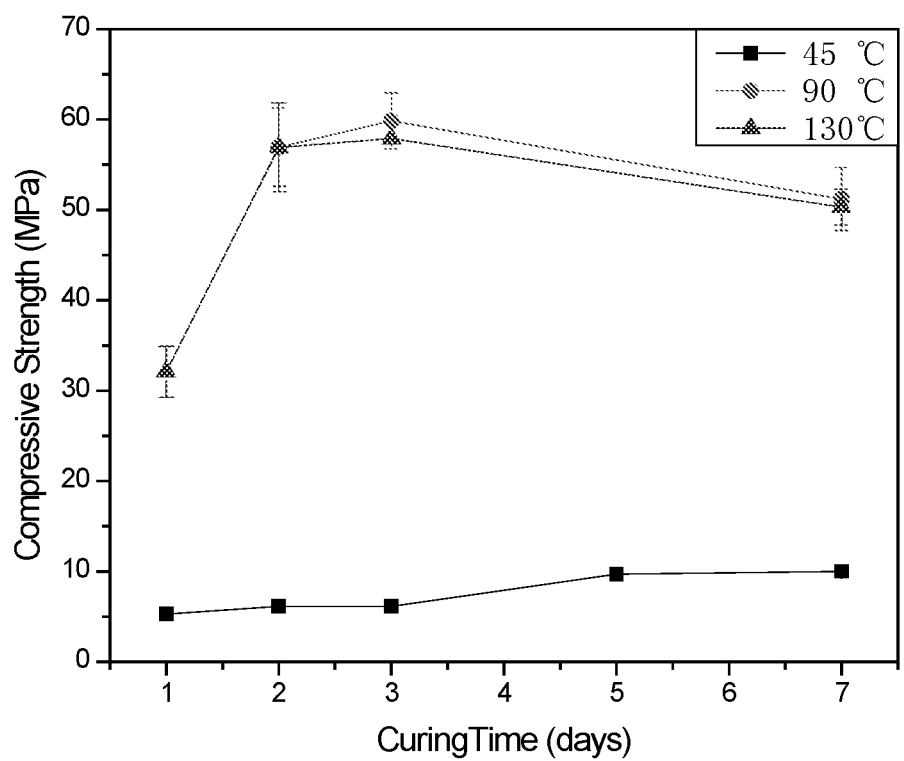
FIG. 7 is a graph representing the compressive strength as a function of curing time and curing temperature for exemplary mine tailing/fly ash construction materials according to an embodiment of the invention.

These samples were then subjected to a compression test, and the results are set forth in FIG. 7. It is shown that a curing temperature of about 90° C. and curing time of about three (3) days exhibits the best compressive strength. In one embodiment, the materials are cured for at least two (2) days. While not significantly detrimental, a curing time of more than three (3) days generally resulted in a slight decrease in compressive strength. While a curing temperature of about 130° C. exhibited almost equivalent compressive strength as compared to a curing temperature of about 90° C., a curing temperature of about 45° C. exhibited much lower compressive strength. Accordingly, in a preferred embodiment, a curing temperature of about 90° C. or higher and a curing time of at least 2 days, but preferably not more than three (3) days, is most preferred.

Example 6

Another set of exemplary mine tailing and fly ash containing construction materials was prepared according to the same parameters of Example 5, except that the materials were activated at either 130° C. or 170° C. for one hour. The durability of the exemplary construction materials in water was then tested. Typically, it is desirable that a construction material not lose its compressive strength after being soaked for an extended period of time in water. The exemplary samples prepared above were soaked in water for 0-30 days to study the impact of soaking on compressive strength.

Specifically, the exemplary materials were soaked in an amount of water at 20 times the weight ratio of water to solid in a sealed container. The samples were then taken out of the water and the surface of the samples were wiped off with a damp cloth. The samples were then weighed within five (5) minutes after being removed from the soaking bath. The specimens were then dried in an oven at about 90° C. for about 10-12 hours. For each experimental condition, three samples were prepared and tested with the compressive strength results being averaged.

Figure 8:
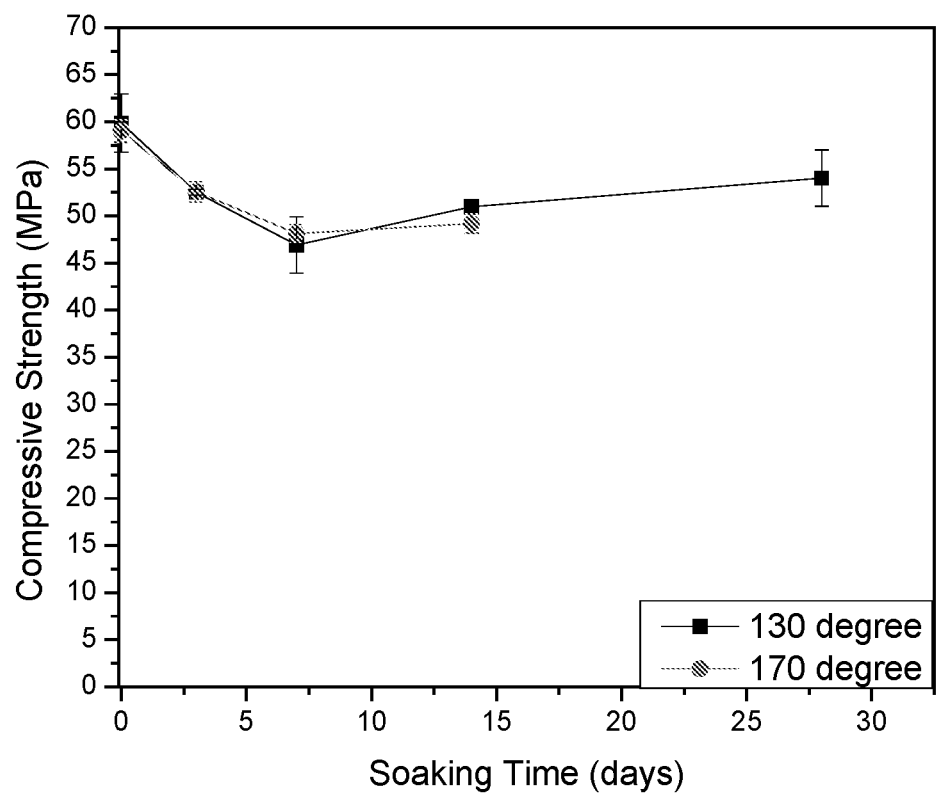
FIG. 8 is a graph representing the compressive strength as a function of soaking time and activation temperature for exemplary mine tailing/fly ash construction materials according to an embodiment of the invention.

The compressive strength results are set forth in FIG. 8, from which it can be seen that compressive strength decreases only slightly after soaking for up to 15 or 30 days. For each sample, the compressive strength was about 60 MPa at day zero and decreased to about 48-50 MPa after being soaking for about 7 days. However, after this period, additional soaking did not appear to further decrease the compressive strength of the construction materials. The water-soaking test results show that the exemplary materials have a very high water resistance as compared to known construction materials. Indeed, prior attempts at forming construction materials from mine tailing materials resulted in samples that lost most of their strength when soaked in water for up to 30 days. Here, the materials retained about 80% of their compressive strength.

Although this invention has been described in connection with specific forms and embodiments thereof, it will be appreciated that various modifications other than those discussed above may be resorted to without departing from the spirit or scope. For example, equivalent elements may be substituted for those specifically shown and described, certain features may be used independently of other features, and in certain cases, particular locations of elements may be reversed or interposed, all without departing from the spirit or scope as defined in the appended Claims.

What is claimed:

1. A mixture for the production of a construction material, the mixture consisting essentially of:
   mine tailing;
   fly ash;
   an alkali solution comprising sodium hydroxide; and
   water, wherein the ratio of fly ash to mine tailing ranges from about 5:100 to about 20:100, based upon weight.

2. The mixture of claim 1, wherein the mine tailing is copper-based mine tailing.

3. The mixture of claim 1, wherein the fly ash is Class C fly ash, Class F fly ash, or a combination thereof.

4. The mixture of claim 1, wherein the weight ratio of sodium hydroxide to mine tailing ranges from about 70:100 to about 80:100.

5. The mixture of claim 1, wherein the alkali solution further includes $Ca(OH)_2$.

6. The mixture of claim 5, wherein the weight ratio of $Ca(OH)_2$ to mine tailing ranges from about 5:100 to 15:100.

7. The mixture of claim 1, wherein the weight ratio of water to mine tailing ranges from about 150:100 to 200:100.

8. The mixture of claim 5, wherein the weight ratio of $Ca(OH)_2$ to mine tailing ranges from about 5:100 to 10:100.

9. A geopolymerization method of forming a construction material, the method comprising:
(a) combining mine tailing, fly ash, an alkali solution comprising sodium hydroxide, and water to form a mixture;
(b) stirring the mixture;
(c) pouring the mixture into a mold;
(d) compressing the mixture; and
(e) curing the mixture,
wherein the ratio of fly ash to mine tailing ranges from about 5:100 to about 20:100, based upon weight.

10. The method of claim 9, wherein step (a) is performed at a temperature of about 90-170° C. for about 40-80 minutes.

11. The method of claim 9, wherein step (d) is performed at a forming pressure of about 3-10 MPa.

12. The method of claim 9, wherein step (e) is performed in an oven at a temperature of about 80-120° C. for about 2-3 days.

13. The method of claim 11, wherein step (e) is performed in an oven at a temperature of about 90° C. for about 3 days.

14. The method of claim 9, wherein the alkali solution further comprises $Ca(OH)_2$.

15. The method of claim 14, wherein the weight ratio of $Ca(OH)_2$ to mine tailing in the mixture ranges from about 5:100 to 15:100.

16. The method of claim 14, wherein the weight ratio of $Ca(OH)_2$ to mine tailing ranges from about 5:100 to 10:100.

17. The method of claim 9, wherein step (d) is performed at a forming pressure of about 10 MPa.

\* \* \* \* \*